US007137640B1

(12) United States Patent
Rice et al.

(10) Patent No.: US 7,137,640 B1
(45) Date of Patent: Nov. 21, 2006

(54) MOTORCYCLE PASSENGER SAFETY HANDLES

(76) Inventors: David E. Rice, 6312 Crater Lake Dr., Roseville, CA (US) 95678; George R. Wong, 3834 Rawhide Rd., Rocklin, CA (US) 95677

( * ) Notice: Subject to any disclaimer, the term of this patent is extended or adjusted under 35 U.S.C. 154(b) by 147 days.

(21) Appl. No.: 10/683,661

(22) Filed: Oct. 9, 2003

(51) Int. Cl.
*B62J 27/00* (2006.01)

(52) U.S. Cl. .................... 280/304.5; 280/293; 180/219

(58) Field of Classification Search ............ 280/288.4, 280/290, 293, 801.1, 801.2, 748, 808; 74/551.1–551.8; 16/421, 426, 436
See application file for complete search history.

(56) References Cited

U.S. PATENT DOCUMENTS

| | | | |
|---|---|---|---|
| 1,310,958 A | 7/1919 | O'Connor | |
| 1,565,016 A | 12/1925 | Lake | |
| 2,563,766 A | 8/1951 | Weinstein | |
| 3,533,107 A | 10/1970 | Raneri | |
| 3,562,812 A | 2/1971 | Greggains | |
| 4,028,742 A | 6/1977 | Marquis | |
| 4,411,222 A | 10/1983 | Wolfson | |
| 4,413,700 A * | 11/1983 | Shiratsuchi | 180/219 |
| 4,429,419 A | 2/1984 | Snyder | |
| 4,981,306 A * | 1/1991 | Young | 280/290 |
| 5,002,149 A * | 3/1991 | Watanabe et al. | 180/219 |
| 5,025,883 A * | 6/1991 | Morinaka et al. | 180/219 |
| 5,419,625 A * | 5/1995 | Iwase et al. | 303/116.1 |
| 6,167,572 B1 | 1/2001 | Naumovitz | |
| 6,662,680 B1 * | 12/2003 | Rocket | 74/551.3 |
| 6,868,584 B1 * | 3/2005 | Trottier | 16/421 |
| 6,896,279 B1 * | 5/2005 | Galvagno | 280/304.5 |

* cited by examiner

*Primary Examiner*—Lesley D. Morris
*Assistant Examiner*—Lee Lum
(74) *Attorney, Agent, or Firm*—Heisler & Associates

(57) ABSTRACT

A safety handles assembly is provided attachable to a motorcycle which provides a place for hands of a rear passenger to hold directly onto the motorcycle without requiring that the rear passenger hold onto the driver of the motorcycle. The assembly preferably includes a main strap girding a seat or other structure on the motorcycle. A pair of handles are coupled to the main strap and extend upwardly and rearwardly toward the rear passenger. The handles are preferably flexible and include hand loops at ends of the handles opposite the main strap. The hand loops can be engaged by hands of the rear passenger so that the rear passenger is holding onto the motorcycle through the assembly. The assembly is preferably positioned with the main strap forward of the driver and with the handles extending upwardly and rearwardly over the legs of the driver and around opposite sides of the waist of the driver.

46 Claims, 2 Drawing Sheets

MOTORCYCLE PASSENGER SAFETY HANDLES

FIELD OF THE INVENTION

The following invention relates to devices attachable to a motorcycle which are graspable by hands of a passenger upon a motorcycle. More particularly, this invention relates to devices which provide support for hands of a rear passenger behind a driver of a motorcycle.

BACKGROUND OF THE INVENTION

Most motorcycles are provided with an elongate seat sized sufficient to accommodate at least two riders, including a driver and a rear passenger. In the riding of the motorcycle, the driver maintains proper balance and position upon the seat both by sitting upon the seat and engaging the seat and other portions of the motorcycle with legs of the driver, as well as holding onto the handlebars of the motorcycle. The rear passenger can similarly be supported upon the seat with the rear passenger's legs. The rear passenger will typically additionally extend hands around the waist of the driver. Without good hand support for the rear passenger, the rear passenger is less able to maintain balance safely upon the seat of the motorcycle.

Often the standard arrangement for the rear passenger to hold the waist of the driver is unacceptable. For instance, the rear passenger may be too far behind the driver to comfortably reach around the waist of the driver. The rear passenger may have a preference for avoiding such intimate contact with the driver. The driver may have a large waist which cannot easily be grasped by the rear passenger, or the driver may have a high susceptibility to discomfort when being held around the waist by the hands of the rear passenger, especially for long periods of time. In each of these cases, as well as others, a need exists for some form of handles for the rear passenger of the motorcycle which are connected directly to the motorcycle, and not to the driver.

In at least one case, it is known to attach rigid handles to a gas tank area directly forward of the driver's seat for grasping by the rear passenger. Such a system is disclosed in U.S. Pat. No. 5,002,149 to Watanabe. With the Watanabe device, the rear passenger must extend arms forward a significant distance to reach the gas tank area of the motorcycle. Such an arrangement requires a particularly thin driver and a rear passenger sitting particularly close to the driver. Additionally, the rear passenger must typically remain in intimate contact with the driver to be able to adequately reach forward to grasp these rigid handles. Also, such rigid handles are permanently affixed to the motorcycle or require specialized tools for the attachment and detachment thereof. Hence, such a system as taught by Watanabe is not easily removable and used on multiple different motorcycles or easily retrofitted onto a motorcycle which does not already have accommodation for such handles, such as by predrilled and tapped holes provided upon the motorcycle. Finally, the rigid handles taught by Watanabe do not provide any degree of flexibility in the positioning of hands of the rear passenger, instead requiring each rear passenger to maintain a fixed precise body position so that the handles can be adequately reached.

Accordingly, a need exists for a motorcycle handles assembly which can be readily removably attached to the motorcycle and provide handles which can be grasped easily by the rear passenger with the rear passenger in a variety of different positions.

SUMMARY OF THE INVENTION

With this invention a rear passenger handles assembly is provided which conveniently provides handles for grasping by the hands of the rear passenger on a motorcycle. The handles assembly includes a first handle and a second handle preferably in the form of flexible elongate lines of a textile fabric or other material. Each handle preferably includes an upper end and a lower end with the upper end configured to be grasped by hands of the rear passenger and with the lower end configured to be coupled to the motorcycle. In a preferred embodiment a main strap is provided which is capable of girding a seat of the motorcycle. The lower ends of each of the handles are attached to this main strap and then extend up to the upper ends of the handles which are grasped by the hands of the rear passenger.

Preferably, the upper ends of the handles include strap loops which facilitate easy grasping by the hands of the rear passenger. These strap loops are preferably sized large enough for fingers of a rear passenger to pass therethrough, but too small for the entire hand and wrist of the passenger to pass therethrough. Such sizing helps to ensure that the rear passenger only remains in contact with the handles when the rear passenger chooses to do so by closing hands of the rear passenger about the hand loops, without the rear passenger unintentionally becoming entangled within the hand loops.

The main strap is preferably located slightly forward of where the driver of the motorcycle is sitting, and girding the seat of the motorcycle. The handles thus extend up between the legs of the driver and extend at least partially over each of the legs of the driver and at least partially around a torso of the driver. In this position they can be conveniently grasped by the rear passenger without interfering with the driver in any way.

OBJECTS OF THE INVENTION

Accordingly, a primary object of the present invention is to provide a structure attachable to a motorcycle which can be grasped by hands of a rear passenger on the motorcycle in a convenient fashion to help the rear passenger to maintain balance and a comfortable position upon the motorcycle.

Another object of the present invention is to provide hand support for a rear passenger on a motorcycle without interfering in any way with the comfort of the driver and the ability of the driver to operate the motorcycle.

Another object of the present invention is to provide a motorcycle rear passenger handles assembly which is removably attachable to the motorcycle so that it can be easily retrofitted onto the motorcycle.

Another object of the present invention is to provide a motorcycle rear passenger handles assembly which is flexible to accommodate desired hand support positions for the rear passenger in a variety of different locations and to accommodate rear passengers of different sizes and seating position preferences.

Another object of the present invention is to provide a motorcycle passenger safety handles assembly which can be easily held by a rear passenger on a motorcycle, but which can be easily released by a rear passenger of the motorcycle should the rear passenger need to quickly become detached from the motorcycle.

Another object of the present invention is to provide a motorcycle passenger handles assembly which is adjustably configurable to securely attach to the motorcycle and provide handles at a desired position for the rear passenger upon the motorcycle.

Other further objects of the present invention will become apparent from a careful reading of the included drawing figures, the claims and detailed description of the invention.

DESCRIPTION OF THE PREFERRED EMBODIMENT

Figure 1:
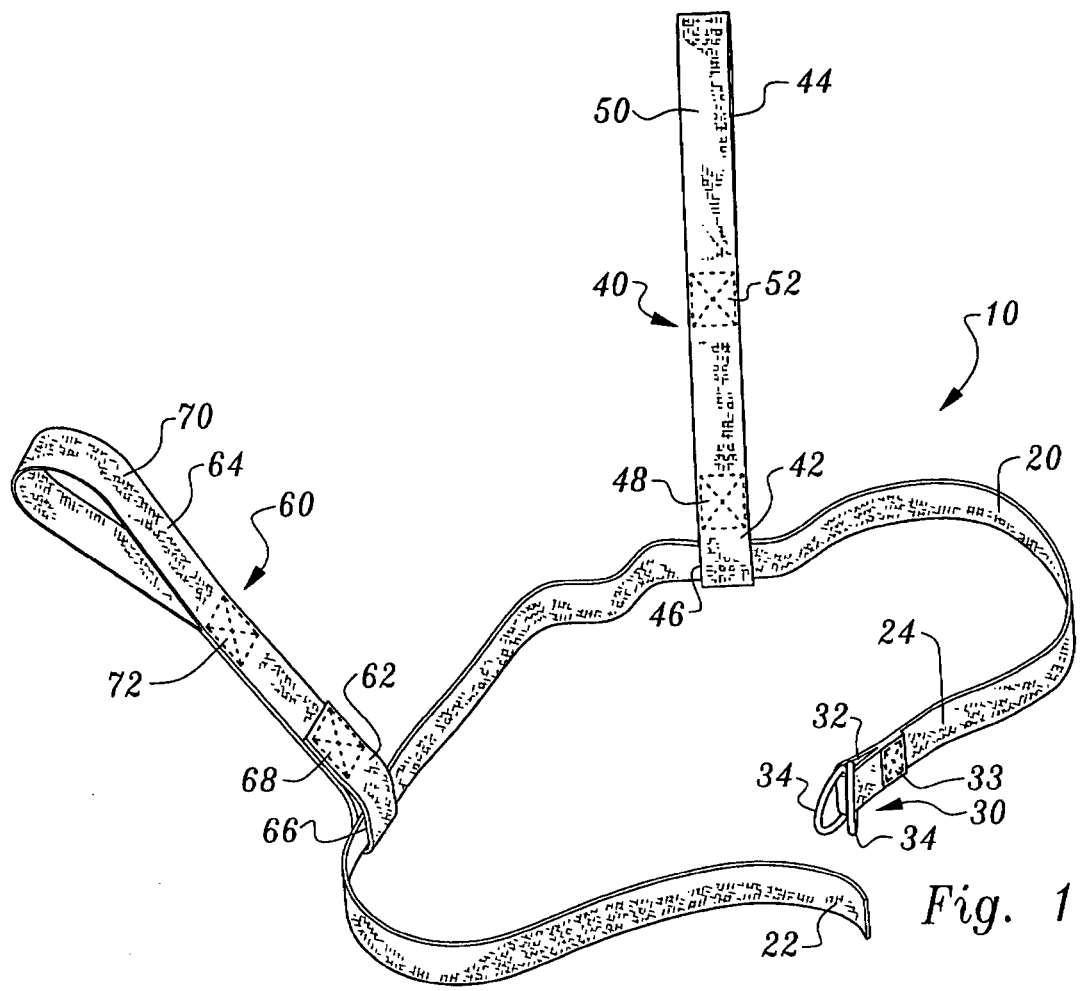
FIG. 1 is a perspective view of a preferred embodiment of the invention with ends of a main strap thereof shown disconnected.

Referring to the drawings, wherein like reference numerals represent like parts throughout the various drawing figures, reference numeral 10 is directed to a safety handles assembly attachable to a motorcycle M and graspable by a rear passenger P with hands H. The safety handles assembly 10 allows the rear passenger P to more effectively sit upon the seat S and maintain proper balance without requiring that the rear passenger P hold onto the driver D directly.

Figure 2:
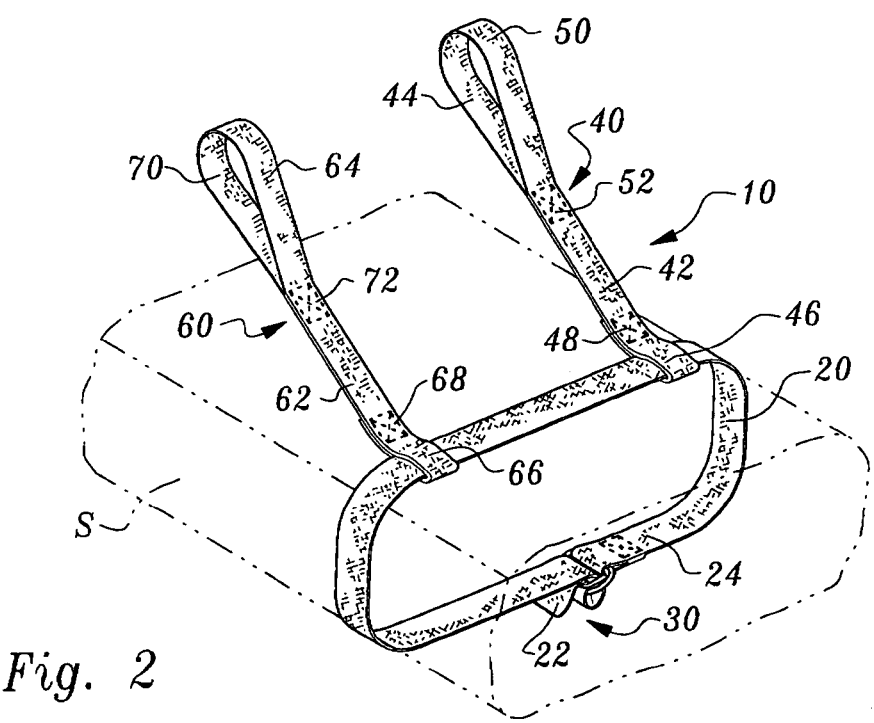
FIG. 2 is a perspective view of that which is shown in FIG. 1 but with the ends of the main strap coupled together and with a motorcycle seat shown in broken lines with the main strap girding the seat and illustrating one orientation for the invention when in use.

In essence, and with particular reference to FIG. 1, basic details of the safety handles assembly 10 are described. The assembly 10 preferably includes a main strap 20 of flexible elongate form adapted to gird a structure of the motorcycle M, such as the seat S (FIG. 2). A first handle 40 is coupled to the motorcycle M, preferably through the main strap 20. The first handle 40 preferably includes a hand loop 50 at an end thereof spaced from the motorcycle M. The hand loop 50 provides a preferred form of means to assist the rear passenger P in grasping the first handle 40. A second handle 60 preferably similar to the first handle 40, is also coupled to the motorcycle, preferably through the main strap 20. A hand loop 70 is included on the second handle 60 in a preferred form of the invention at a location on the second handle 60 spaced from the motorcycle M. The hand loops 50, 70 are preferably similar in form and provide a location for hands H of the rear passenger P to easily grasp the handles 40, 60 to help the rear passenger P maintain balance upon the motorcycle M.

More particularly, and with particular reference to FIG. 1, the specific details of the safety handles assembly 10 are described. The assembly 10 preferably includes the main strap 20 from which the handles 40, 60 extend. However, as an alternative the main strap 20 can be eliminated and the handles 40, 60 could be attached to the motorcycle M directly in either a permanent or a removable fashion, such as through the use of suitable fasteners upon the motorcycle M.

Figure 3:
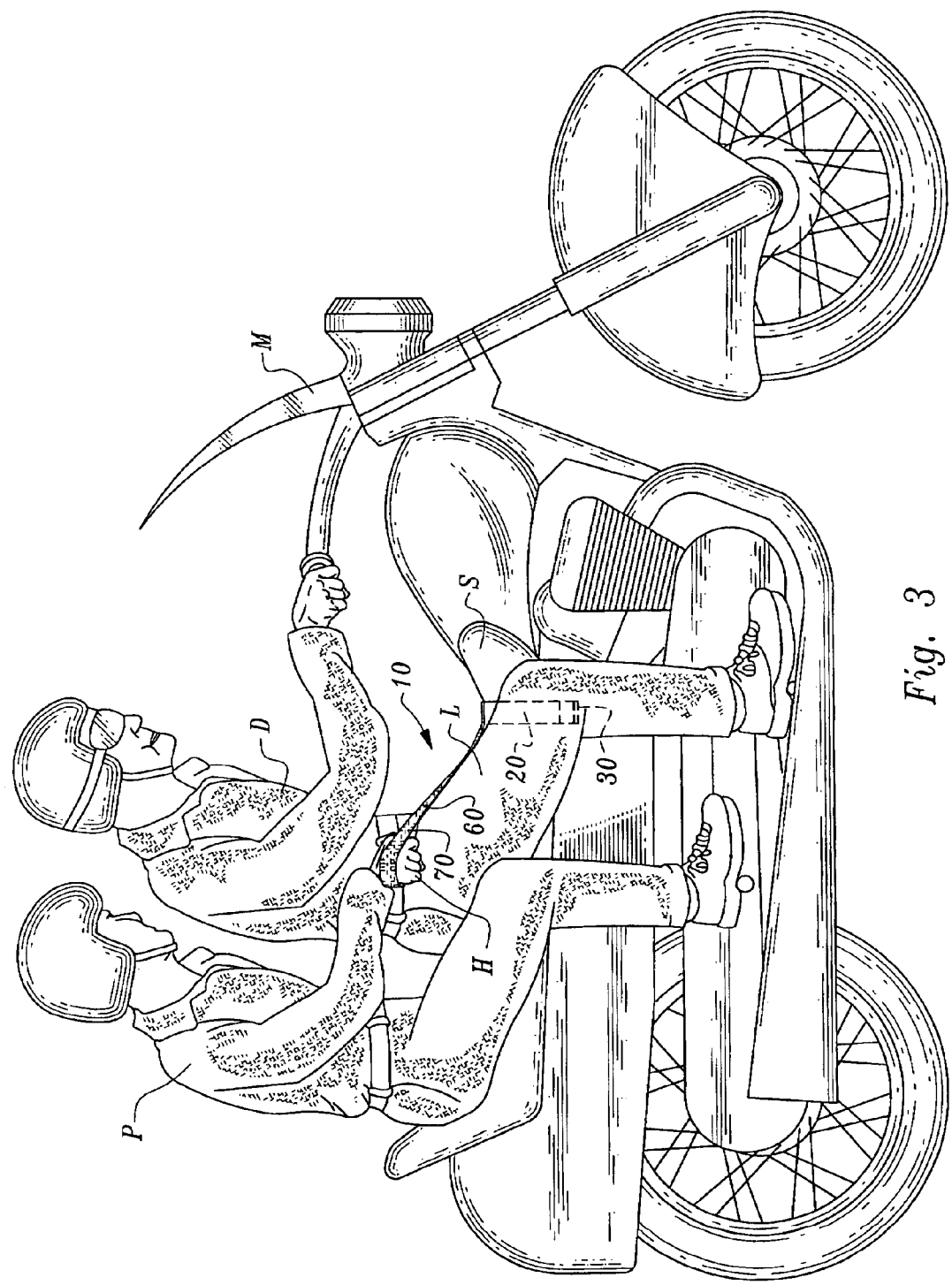
FIG. 3 is a side elevation view of a motorcycle with the invention attached thereto and with a driver and a rear passenger seated upon the motorcycle seat with the rear passenger using the invention according to a method of this invention.

According to the preferred embodiment, the main strap 20 is a flexible elongate strand, preferably of a substantially inelastic material such as woven fabric commonly used to form seat belts, tie down straps and the like. The main strap 20 extends from a free end 22 to a capture end 24 at opposite extreme ends of the main strap 20. The main strap 20 is preferably sufficiently long between the free end 22 and capture end 24 to surround a structure on the motorcycle M to which the main strap 20 can be attached. Most preferably, the main strap 20 is sized to gird the seat S of the motorcycle M in a generally vertical plane perpendicular to a long axis of the seat S (FIG. 3).

A buckle 30 is preferably provided between the ends 22, 24, and is most preferably attached to the capture end 24. The buckle 30 is preferably in the form of a loop 32 at the capture end 24 which has a pair of "D" rings 34 trapped within the loop 32 of the capture end 24. Stitching 33 holds the capture end 24 of the main strap 20 back upon itself to form the loop 32. As shown in FIG. 2, the free end 22 can be routed in a serpentine fashion through the "D" ring 34 to secure the main strap 20 to the seat S or other structure on the motorcycle M. Specifically, the free end 22 is first passed through both of the "D" rings 34 and doubled back to pass through the first one of the "D" rings 34 only. When the free end 22 is pulled tight, the main strap 20 is held closed, unless a user pivots the "D" rings 34 to release the free end 22 from the buckle 30 formed by the "D" rings 34.

Other alternative buckles could similarly be provided. For instance, various different clips having complemental halves can be provided between the free end 22 and the capture end 24 which can snap together, either with or without length adjustment of the main strap 20. The buckle 30 could be eliminated and the free end 22 and capture end 24 merely tied together. Also, fasteners could be utilized such as velcro, snaps, buttons, zippers, hooks or any other known fasteners to hold the free end 22 and the capture end 24 together.

While the main strap 20 is preferably removably attached to the seat S or other structure on the motorcycle M, it is conceivable that the main strap 20 could be permanently attached to the seat S or other structure of the motorcycle M and still function according to this invention, except that the assembly 10 would not then be removable.

The first handle 40 is preferably in the form of an elongate flexible length of material similar to that forming the main strap 20. The first handle 40 extends between a lower end 42 adjacent the main strap 20 and an upper end 44 most distant from the main strap 20. A strap loop 46 is preferably formed at the lower end 42 of the first handle 40 by reversing the lower end 42 of the first handle 40 back upon itself and providing stitching 48. The strap loop 46 is thus provided preferably with size sufficient to allow the main strap 20 to pass therethrough. While the main strap 20 could be stitched directly to the first handle 40, most preferably the strap loop 46 is not affixed to the main strap 20, but rather is only attached in a manner which allows the main strap 20 to slide through the strap loop 46. In this way, the position of the first handle 40 upon the main strap 20 can be readily adjusted.

The elongate flexible length of material forming the first handle 40 can either be of fixed length or can be configured to be adjustable. If length adjustability is desired, the length of material forming the first handle 40 can have a length adjustable region which is adjustable in length such as by passing through loops in a fashion which increases or decreases an amount of the elongate flexible length of material which is doubled up along the length of the first handle 40. In this way, a length of the first handle 40 can be adjusted. Alternatively, this doubling up of the elongate flexible length of material forming the first handle 40 could also provide the strap loop at which the first handle 40 attaches to the main strap 20. Other means to adjust the length of the first handle 40 could include providing multiple separate hand loops similar to the hand loop 50 at different distances spaced away from the main strap 20 or to utilize snaps, buttons or other fasteners to cause portions of the elongate flexible material forming the first handle 40 to be attached to itself in ways which gather up a portion of the length of the elongate flexible material forming the first handle 40, so that an overall length of the first handle 40 can be adjusted.

While the first handle 40 is preferably coupled to the motorcycle M through the main strap 20 attached to the seat S or other structure of the motorcycle M, it is conceivable that the lower end 42 of the first handle 40 could be secured directly to the motorcycle M or to some other structure than the main strap 20 which is already existing upon the motorcycle M, or attached to the motorcycle M for providing a support to which the first handle 40 can be attached. For instance, the lower end 42 of the first handle 40 could merely be tied around the seat S or tied around some other structure upon the motorcycle M.

Alternatively, snaps, or other two part fasteners could be provided with one portion of the fastener affixed to the motorcycle in either a temporary or permanent fashion and with the other portion of the complemental fastener provided upon the lower end 42 of the first end 40. With such an alternative embodiment of this invention the first handle 40 would be directly attached to the motorcycle M but still provide a flexible structure which could be oriented extending up from the motorcycle M and provide a location for a rear passenger P to conveniently grasp the first handle 40 and maintain contact with the motorcycle M through the hand H of the rear passenger P.

Most preferably, a hand loop 50 is provided at the upper end 44 of the first handle opposite the lower end 42 of the main strap 20. This hand loop 50 is provided by reversing the upper end 44 back upon itself and providing stitching 52 to form the hand loop 50. The hand loop 50 provides a preferred form of a means to assist the rear passenger in grasping the first handle 40. Other equivalent means could similarly be provided including molded grips such as those provided on handlebars or on the end of a jump rope, or provided on the end of a pull cord such as that used to start a power lawn mower, or merely a roughened or other high friction surface provided on the upper end 44 of the first handle 40 to provide a region where hands H of the rear passenger P can easily and securely hold the first handle 40.

Most preferably, the hand loop 50 or other equivalent structure on the upper end 44 of the first handle 40 for engagement with the hand H of the rear passenger P can be both easily grasped and easily released when desired by the rear passenger P. For instance, it may be desirable in a crash situation for the rear passenger P to fall clear of the motorcycle, and not remain attached to the motorcycle M to minimize injury to the rear passenger P, and perhaps also to the driver D. Hence, it is desirable that the rear passenger P not get entangled within the assembly 10 of this invention, such as by having hands H of the rear passenger P passing entirely through the hand loop 50 so that the hands H of the rear passenger P might become entangled within the hand loop 50 and not be easily removed.

To avoid such a potentially disadvantageous situation, the hand loop 50 is preferably sized slightly smaller than an adult human hand. In this way, the hand H of the rear passenger P cannot be passed through the hand loop 50, but rather only fingers of the hand H of the rear passenger P pass through the hand loop 50. Thus, the rear passenger P can easily release the hand loop 50 and the first handle 40 by merely opening the fingers. If desired, the hand loop 50 can be provided with an adjustable width to accommodate rear passengers P of different hand sizes and still maintain maximum safety. Alternatively, separate assemblies 10 having different hand loops sizes could be provided, such as for both children and adults.

Most preferably, a single hand loop 50 is provided which has a width of less than three inches to provide the benefits identified above. It is conceivable that a hand loop 50 have as little as two inches or perhaps even one inch could be provided and still provide many of the benefits of this invention. If safety and other considerations should prove to show that it is beneficial for the entire hand of the rear passenger P to pass through the hand loop 50, the hand loop 50 could be sized sufficiently large to allow the hand H of the rear passenger P to pass through the hand loop 50, in an alternative embodiment.

The assembly 10 also includes a second handle 60 extending from the main strap 20 or otherwise coupled to the motorcycle M. The second handle 60 is preferably identical to the first handle 40. The second handle 60 thus includes a lower end 62 spaced from an upper end 64. A strap loop 66 is provided adjacent the lower end 62 which couples the second handle 60 to the main strap 20 according to the preferred embodiment. Stitching 68 closes the strap loop 66 about the main strap 20.

A hand loop 70 is preferably provided at the upper end 64 of the second handle 60. The hand loop 70 is preferably identical to the hand loop 50 of the first handle 40. Stitching 72 is provided to hold the upper end 64 of the second handle 60 back upon itself to form the hand loop 70. While it is conceivable that the first handle 40 and second handle 60 could be configured differently according to various different embodiments of this invention, most preferably whatever embodiment is provided for the first handle 40 and the second handle 60 is matched by the other handle 60, 40 so that the assembly 10 exhibits symmetry. Alternatively, it is conceivable that only a single handle could be provided and still provide at least some of the benefits according to this invention and it is conceivable that a pair of handles 40, 60 could be provided but with the handles being fashioned according to different embodiments of this invention.

In use and operation, and with particular reference to FIG. 3, details of the method of use of this invention are described. Initially, the main strap 20 is provided as shown in FIG. 1 with the free end 22 spaced from the capture end 24. The main strap 20 is draped over the seat S of the motorcycle M and the buckle 30 is utilized to secure the free end 22 to the capture end 24 and secure the main strap 20 in position girding the seat S (FIGS. 2 and 3).

Preferably, the main strap 20 is located on a portion of the seat S slightly forward of the driver D. The handles 40, 60 are oriented so that they extend from the main strap 20 either on an upper portion of the seat S or from lateral side portions of the seat S. Because the handles 40, 60 preferably include strap loops 46, 66 they can be easily slid along the main strap 20 to be positioned where desired. When the main strap 20 is tightly secured to the seat S, further movement of the handles 40, 60 away from their desired position upon the main strap 20 is discouraged, due to friction between the strap loops 46, 66 and the seat S.

The handles 40, 60 are oriented extending upwardly and rearwardly in a slightly divergent fashion away from each other so that the hand loops 50, 70 are located over the legs L of the driver D and adjacent opposite sides of a waist of the driver D. The length of the handles 40, 60 determine whether the hand loops 50, 70 are in fact slightly forward of the waist of the driver D or past the waist of the driver D and extending further to the rear towards the rear passenger P.

The handles 40, 60 can be made in an adjustable length fashion such as with appropriate clasps which allow a portion of the handles 40, 60 to be doubled over to lengthen or shorten the handles 40, 60 so that the hand loops 50, 70 or other hand H grasping means at the upper ends 44, 64 can be positioned where desired.

The rear passenger P then sits upon the seat S and grasps the hand loops 50, 70 or other portions of the handles 40, 60 while sitting upon the seat S. The rear passenger P thus both has support upon the motorcycle M through the seat S as well as through the assembly 10 provided according to this invention. The driver D is only minimally influenced by the location of the assembly 10 and can thus drive the motorcycle M with maximum comfort and freedom from restraint by the rear passenger P. When the assembly 10 is to be removed the buckle 30 is manipulated to allow the free end 22 to move out of the buckle 30 so that the main strap 20 can be disengaged from the seat S. The assembly 10 can then be used on a separate motorcycle M or stored until needed again.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. For instance, the first handle 40 and second handle 60 could be replaced with a flexible band having two ends with each of the ends of the flexible band similar to the strap loop 46 of the first handle 40 and the strap loop 66 of the second handle 50, and with the flexible band joining these two strap loops 46, 66 together. Such a flexible band would thus be linked at both of its ends back to the main strap 20.

A hand grasping region would be provided upon the flexible band merely by having fingers of the rear passenger grasp the flexible band between the ends which are coupled to the main strap 20.

As with the preferred embodiment, such a flexible band could be adjustable in length and could either be fixed at the ends through the main strap 20 or be slidably adjustable through structures such as the strap loops 46, 66 to allow sliding of the ends of this flexible band.

The flexible band could be grasped by either a single hand or by both hands of the rear passenger. If desired, multiple such flexible bands could be provided, such as with one flexible band for a left hand of the rear passenger and a second flexible band for the right hand of the rear passenger. Such flexible bands would be formed of elongate flexible material similar to that with which the main strap 20 is formed.

When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A motorcycle rear passenger handles assembly, comprising in combination;
    a first handle having an upper end spaced from a lower end;
    said lower end of said first handle adapted to be coupled to a motorcycle;
    said upper end of said first handle adapted to be grasped by a hand of a passenger riding upon the motorcycle;
    a second handle having an upper end spaced from a lower end;
    said lower end of said second handle adapted to be coupled to the motorcycle;
    said upper end of said second handle adapted to be grasped by a hand of a passenger riding upon the motorcycle; and
    wherein both said first handle and said second handle are flexible between said upper ends thereof and said lower ends thereof.

2. A motorcycle rear passenger handles assembly, comprising in combination;
    a first handle having an upper end spaced from a lower end;
    said lower end of said first handle adapted to be coupled to a motorcycle;
    said upper end of said first handle adapted to be grasped by a hand of a passenger riding upon the motorcycle;
    a second handle having an upper end spaced from a lower end;
    said lower end of said second handle adapted to be coupled to the motorcycle;
    said upper end of said second handle adapted to be grasped by a hand of a passenger riding upon the motorcycle; and
    wherein said assembly includes a main strap, both said first handle and said second handle attached to said main strap at lower ends thereof, said main strap adapted to be attached to the motorcycle.

3. The assembly of claim 2 wherein said main strap is adapted to be attached to a seat of said motorcycle upon which said rear passenger and a driver of the motorcycle both sit.

4. The assembly of claim 2 wherein said main strap includes a free end opposite a capture end, said capture end adapted to be releasably attached to said free end, such that said main strap can be configured to gird a portion of the motorcycle.

5. The assembly of claim 4 wherein a buckle is included upon said capture end of said main strap, said buckle adapted to releasably grasp said free end of said main strap.

6. The assembly of claim 2 wherein said first handle and said second handle are each adapted to be slidably attached to said main strap.

7. The assembly of claim 6 wherein both said first handle and said second handle each include strap loops at lower ends thereof, each said strap loop having an opening at least as large as a width of said main strap such that said main strap passes through said strap loops and said strap loops can travel along said main strap.

8. The assembly of claim 7 wherein both said first handle and said second handle each include hand loops at said upper ends thereof, said hand loops defining a region upon said first handle and said second handle where said handles can be grasped by hands of the rear passenger.

9. The assembly of claim 8 wherein said hand loops have a size less than a width of the hand of the rear passenger, such that said hand loops can accommodate fingers passing through said hand loops but are sized to prevent the passage of an entire hand of a rear passenger through either hand loop, such that the rear passenger can easily grasp the hand loops but is prevented from having hands and wrists of the rear passenger entangled within the hand loops.

10. A method for a motorcycle rear passenger to hold on while riding a motorcycle and without holding directly onto the driver, the steps including:
provoding a motorcycle having an elongate seat with sufficient length for both the motorcycle driver and the motorcycle rear passenger to sit upon the elongate seat;
coupling a pair of handles to the seat;
configuring each of the handles to include a lower end spaced from an upper end with the lower ends of the handles adapted to be coupled to the seat of the motorcycle;
placing at least one finger of each hand of the rear passenger in engagement with upper ends of each handle; and
wherein said configuring step includes the step of providing hand loops adjacent the upper ends of each handle.

11. The method of claim 10 wherein said placing step includes the further step of placing at least one finger of each hand through the loops at the upper ends of each handle.

12. The method of claim 11 wherein said coupling step includes the steps of:
providing an elongate main strap with each of the handles coupled to the main strap; and
girding the seat of the motorcycle with the main strap.

13. The method of claim 12 including the further step of locating the main strap girding the seat on a portion of the seat located forward of at least a portion of the motorcycle driver.

14. The method of claim 13 including the further step of configuring each of the handles to include strap loops adjacent the lower ends of the handles, the strap loops sized to allow the main strap to pass therethrough such that the strap loops can slide along the main strap.

15. The method of claim 11 including the further step of restricting a size of the hand loops to less than a hand size of the motorcycle passenger, such that only fingers of the passenger can pass through the hand loops.

16. A method for a motorcycle rear passenger to hold on while riding a motorcycle and without holding directly onto the driver, the steps including:
providing a motorcycle having an elongate seat with sufficient length for both the motorcycle driver and the motorcycle rear passenger to sit upon the elongate seat;
coupling a pair of handles to the seat;
configuring each of the handles to include a lower end spaced from an upper end with the lower ends of the handles adapted to be coupled to the seat of the motorcycle;
placing at least one finger of each hand of the rear passenger in engagement with upper ends of each handle; and
wherein said configuring step includes the step of forming each of the handles from flexible material.

17. A method for a motorcycle rear passenger to hold on while riding a motorcycle and without holding directly onto the driver, the steps including:
providing a motorcycle having an elongate seat with sufficient length for both the motorcycle driver and the motorcycle rear passenger to sit upon the elongate seat;
coupling a pair of handles to the seat;
configuring each of the handles to include a lower end spaced from an upper end with the lower ends of the handles adapted to be coupled to the seat of the motorcycle;
placing at least one finger of each hand of the rear passenger in engagement with upper ends of each handle; and
locating each of the handles at least partially forward of the motorcycle driver in front of the rear passenger upon the elongate seat.

18. The method of claim 17 wherein said locating step includes the further step of routing the handles over legs of the motorcycle driver and at least partially around opposite sides of a torso of the motorcycle driver.

19. A hand supports apparatus for use by a rear passenger seated behind a driver of a motorcycle, the hand supports apparatus comprising in combination:
a first hand support coupled to the motorcycle and flexibly extending from the motorcycle;
a second hand support coupled to the motorcycle and flexibly extending from the motorcycle; and
wherein said supports are in the form of flexible elongate lines with upper ends adapted to be grasped by hands of the rear passenger and lower ends coupled to the motorcycle.

20. The apparatus of claim 19 wherein said apparatus includes a main strap having an elongate form girding at least a portion of the motorcycle, said lower ends of said first hand support and said second hand support each coupled to said main strap.

21. The apparatus of claim 20 wherein said lower ends of said first hand support and said second hand support are adapted to be slidably coupled to said main strap.

22. The apparatus of claim 21 wherein said first hand support and said second hand support each include strap loops adjacent said lower ends thereof, said strap loops having an opening sized to receive at least a portion of said main strap passing therethrough.

23. The apparatus of claim 20 wherein said upper ends of said first hand support and said second hand support each include hand loops thereon, said hand loops adapted to be grasped by hands of the rear passenger.

24. The apparatus of claim 20 wherein said main strap includes a means to attach to itself in a removable fashion.

25. The apparatus of claim 20 wherein said main strap includes a free end and a capture end at opposite ends of said main strap, and wherein a buckle is provided between said free end and said capture end, said buckle adapted to join said free end to said capture end in a releasable fashion.

26. The apparatus of claim 19 wherein said flexible elongate lines are substantially inelastic linearly.

27. The apparatus of claim 26 wherein said flexible elongate lines are rectangular in cross-section with a width dimension greater than a thickness dimension, such that said flexible elongate lines are generally in the form of belts.

28. A rear passenger handles apparatus for a motorcycle, the apparatus comprising in combination:
a first handle having an upper end spaced from a lower end;
said lower end of said first handle including means to attach to a motorcycle;
said upper end of said first handle including means to be grasped by a hand of a passenger riding upon the motorcycle behind a driver of the motorcycle;
a second handle having an upper end spaced from a lower end;
said lower end of said second handle including means to attach to the motorcycle;
said upper end of said second handle including means to be grasped by a hand of the passenger riding upon the motorcycle; and wherein said lower end attachment means of both said first handle and said second handle includes a main strap with said lower ends of each said handle attached to said main strap and said main strap including a free end opposite a capture end and a means to secure said free end to said capture end with said main strap girding a structure on the motorcycle.

29. The apparatus of claim 28 wherein said means to secure said free end to said capture end includes a buckle.

30. The apparatus of claim 28 wherein said means to secure said free end to said capture end includes said free end tied to said capture end.

31. A rear passenger handles apparatus for a motorcycle, the apparatus comprising in combination:
a first handle having an upper end spaced from a lower end;
said lower end of said first handle including means to attach to a motorcycle;
said upper end of said first handle including means to be grasped by a hand of a passenger riding upon the motorcycle behind a driver of the motorcycle;
a second handle having an upper end spaced from a lower end;
said lower end of said second handle including means to attach to the motorcycle;
said upper end of said second handle including means to be grasped by a hand of the passenger riding upon the motorcycle; and
wherein each said handle is formed of a flexible elongate line.

32. The apparatus of claim 31 wherein said flexible elongate line of each said handle is substantially inelastic.

33. A rear passenger handles apparatus for a motorcycle, the apparatus comprising in combination:
a first handle having an upper end spaced from a lower end;
said lower end of said first handle including means to attach to a motorcycle;
said upper end of said first handle including means to be grasped by a hand of a passenger riding upon the motorcycle behind a driver of the motorcycle;
a second handle having an upper end spaced from a lower end;
said lower end of said second handle including means to attach to the motorcycle;
said upper end of said second handle including means to be grasped by a hand of the passenger riding upon the motorcycle; and
wherein said apparatus includes a main strap with both said first handle and said second handle attached to said main strap at said lower ends thereof, said main strap adapted to be attached to the motorcycle.

34. The apparatus of claim 33 wherein said main strap is adapted to be attached to a seat of said motorcycle upon which said rear passenger and a driver of the motorcycle both sit.

35. The apparatus of claim 33 wherein said first handle and said second handle are each adapted to be slidably attached to said main strap.

36. The apparatus of claim 34 wherein both said first handle and said second handle each include strap loops at lower ends thereof, each said strap loop having an opening at least as large as a width of said main strap such that said main strap can pass through said strap loops and said strap loops can travel along said main strap.

37. The apparatus of claim 36 wherein both said first handle and said second handle each include hand loops at said upper ends thereof, said hand loops defining a region upon said first handle and said second handle where said handles can be grasped by hands of the rear passenger.

38. The apparatus of claim 37 wherein said hand loops have a size less than a width of the hand of the rear passenger, such that said hand loops can accommodate fingers passing through said hand loops but are sized to prevent the passage of an entire hand of a rear passenger through the hand loops, such that the rear passenger can easily grasp the hand loops but is prevented from having hands and wrists of the rear passenger entangled within the hand loops.

39. A motorcycle hand grip, especially for a rear passenger behind a driver upon the motorcycle, the hand grip comprising in combination:
a flexible main strap adapted to attach to the motorcycle; and
at least one handle coupled to said main strap independent of attachment to the driver, said handle including a hand grasping portion thereon adapted to be grasped by the rear passenger, such that the rear passenger can hold onto the motorcycle through said hand grip without interfering with the driver.

40. The hand grip of claim 39 wherein said main strap is in the form of a loop adapted to gird a portion of the motorcycle.

41. The hand grip of claim 40 wherein said main strap is adapted to gird a seat of the motorcycle upon which the driver and the rear passenger are seated.

42. The hand grip of claim 40 wherein said hand grasping portion of said handle includes a hand loop thereon, said hand loop sized to allow at least one finger of a hand of a rear passenger to pass therethrough to grasp said handle.

43. The hand grip of claim 42 wherein said handle has a flexible elongate form between an upper end supporting said hand loop thereon and a lower end attached to said main strap.

44. The hand grip of claim 43 wherein said handle includes means to be adjusted in length between said upper end and said lower end.

45. The hand grip of claim 40 wherein said at least one handle includes an elongate flexible band with two ends, each said end coupled to said main strap; and
wherein said hand grasping region of said at least one handle is located between said two ends of said flexible band.

46. The hand grip of claim 45 wherein at least one of said two ends is slidably attached to said main strap.

* * * * *